Jan. 17, 1967 H. STAEUDLE 3,299,287
CIRCUIT TO OBTAIN THE ABSOLUTE VALUE OF THE
DIFFERENCE OF TWO VOLTAGES
Filed Dec. 30, 1963

HANS STAEUDLE
INVENTOR.
BY J. M. St. Amand
ATTORNEY

United States Patent Office 3,299,287 Patented Jan. 17, 1967

3,299,287

CIRCUIT TO OBTAIN THE ABSOLUTE VALUE OF THE DIFFERENCE OF TWO VOLTAGES

Hans Staeudle, Arlington, Calif., assignor to the United States of America as represented by the Secretary of the Navy Filed Dec. 30, 1963, Ser. No. 334,677
9 Claims. (Cl. 307—88.5)

The invention herein described may be manufactured and used by or for the Government of the United States of America for governmental purposes without the payment of any royalties thereon or therefor.

The present invention relates to a means for obtaining the absolute difference of two voltages and more particularly to a means for obtaining the absolute difference of two signals in the video frequency range.

The technique employed in the circuit of the present invention uses different paths for the positive and negative voltages which can be adjusted so that they are equal in frequency response and gain. Whereas, prior devices were limited in their frequency range and also had the disadvantage of not being able to change the frequency response of one path without changing the response of another.

It is an object of the invention; therefore, to provide a means for obtaining the absolute difference of two signals.

Another object of the invention is to provide a circuit to obtain the absolute difference of two signals that uses different paths for positive and negative voltages which can be so adjusted that they are equal in frequency response and gain.

A further object of the invention is to provide a novel circuit for obtaining the absolute difference of two signals in the video frequency range.

Figure 1:
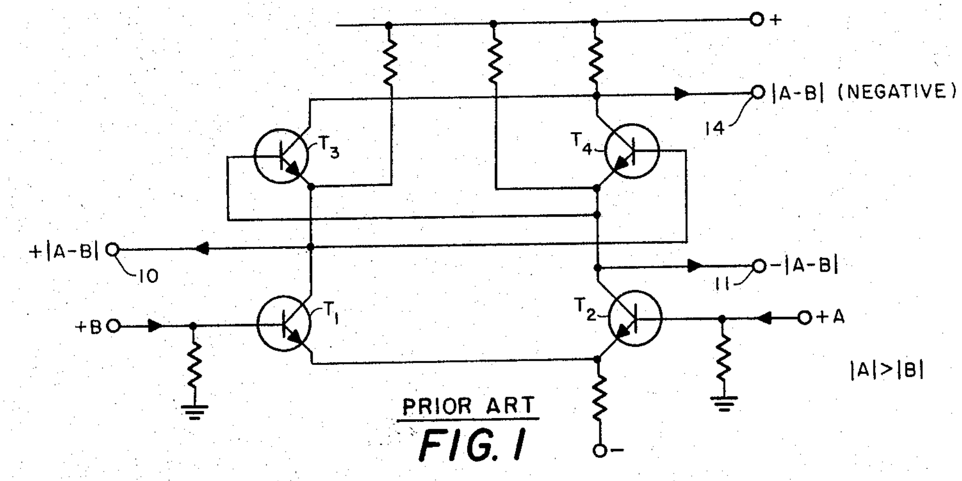
PRIOR ART FIG. 1

Other objects and many of the attendant advantages of this invention will become readily appreciated as the same becomes better understood by reference to the following detailed description when considered in connection with the accompanying drawings wherein:

FIG. 1 is a typical prior art circuit.

FIGI. 2 is a circuit diagram showing an embodiment of the present invention using different paths for positive and negative voltages.

Figure 3:
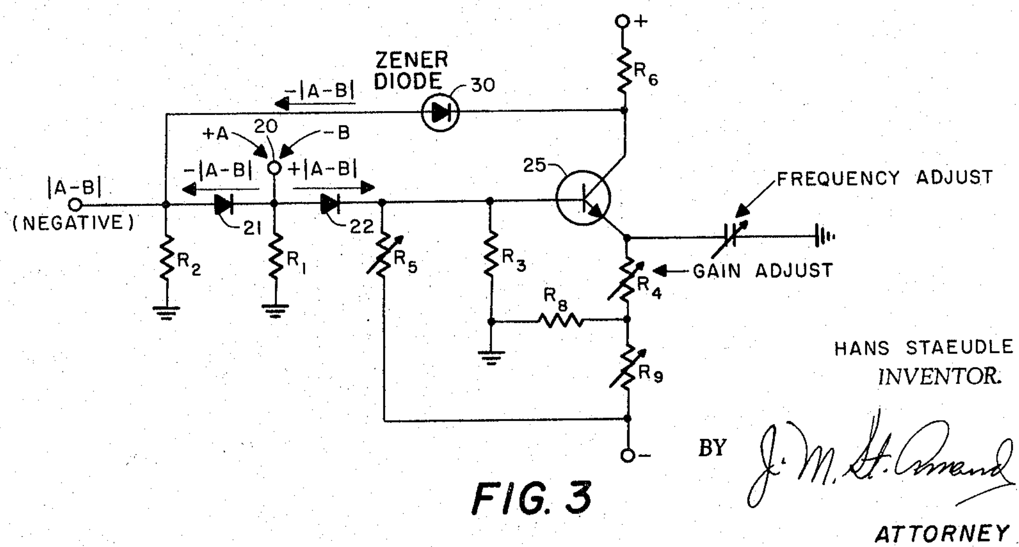

FIG. 3 is another embodiment of the present invention which operates at D.-C. as well as A.-C. input voltages.

The circuit of FIG. 1 will be discussed primarily for the purpose of comparing prior circuits to the circuit of the present invention. All of the methods hitherto known are basically alike and make use of a differential amplifier in the first part of the circuit. In FIG. 1, inputs A and B are applied to the respective bases of transistors $T_2$ and $T_1$. Differential amplifier output 10 will be positive and differential amplifier output 11 will be negative if input A>B, or vice versa if input B>A. The second part of this circuit selects and amplifies either the positive or negative difference voltage (the polarity selected depends on whether the transistors are of the pnp- or npn-type). A positive signal will cause either transistor, $T_1$ or $T_2$, to conduct to the base of which it is applied, whereas a negative signal will have no influence on the output 14, since transistors $T_3$ and $T_4$ are either not biased at all (Class C amplifier) or are biased in such a way that they just start to conduct (Class B amplifier). To get reasonable accuracy, matched transistor pairs ($T_1$ and $T_2$) must be used in the differential amplifier as well as in the following circuit ($T_3$ and $T_4$). This circuit also has the disadvantage of being limited to D.-C. or low frequency response. While it is possible to extend the frequency response of normal video-amplifiers by means of inductive reactance or capacitive reactance networks, this method fails as a differential amplifier, since there are two amplification paths with different frequency response. Depending on the amplitude of the input signal, transistor $T_1$ or $T_2$ will either work similar to a grounded emitter or to a grounded base circuit and it is not possible to change the frequency response of one amplification path without changing the frequency response of the other path. This means that, in the circuit of FIG. 1, the output signal is as well a function of the applied frequency as the amplitudes of the input signals.

The circuits of the present invention avoid the aforementioned disadvantages by using different paths for the positive and the negative voltages, which can also be so adjusted that they are equal in frequency response and gain.

Figure 2:
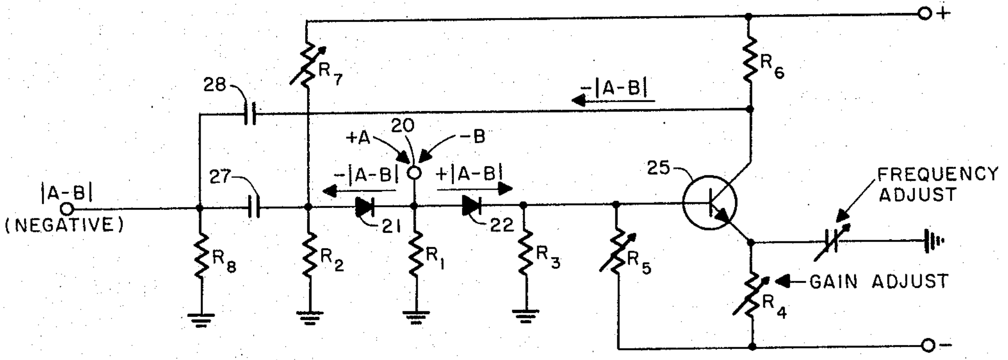

In the circuit of FIG. 2, the input signals +A and −B are applied at input 20. There will then be a voltage $A-B$ across resistor $R_1$ which may be positive or negative depending upon the amplitudes of +A and −B. If $A-B$ is negative, diode 21 conducts, diode 22 is reverse biased and the output voltage across resistor $R_8$ will be $-(A-B)$. If $A-B$ is positive, then diode 21 will be reverse biased, diode 22 will conduct and an input voltage will be applied to the transistor amplifier 25. So, when the input signal at the base of transistor amplifier 25 is positive, the output signal at the collector and across resistor $R_8$ will be negative, i.e. again the output signal will be $-(A-B)$.

The cutoff voltage of fast switching silicon diodes is not zero but approximately +0.2 volt and the dynamic forward resistance is approximately 200 ohms. However, selected diodes do not have to be used in this circuit, since the bias of each diode, 21 and 22, can be adjusted separately by means of variable resistors $R_5$ and $R_7$ and because the influence of the different dynamic forward resistances of the diodes can be eliminated by adjusting the gain of the amplifier stage by varying resistor $R_4$. Further, since the frequency response of the amplifier can be extended by the above mentioned means, the cutoff frequency of this circuit, FIG. 2, is considerably higher than that obtainable with the old method which was mainly limited by the semi-conductor devices used in the circuit, e.g., FIG. 1. In the circuit of the present invention, FIG. 2, the output signals are coupled to resistor $R_8$ by capacitors 27 and 28. This A.-C. coupling limits the application of the circuit to A.-C. voltages of certain waveforms. However, to provide a circuit that is applicable at D.-C. as well as A.-C. input voltages, the circuit of FIG. 2 may be modified, as shown in FIG. 3, using a Zener diode 30 as a coupling device. In the modified circuit of FIG. 3 the bias diodes 21 and 22 may be adjusted by resistors $R_5$ and $R_9$, and $R_4$ is the gain-adjust.

Obviously many modifications and variations of the present invention are possible in the light of the above teachings. It is therefore to be understood that within the scope of the appended claims the invention may be practiced otherwise than as specifically described.

What is claimed is:

1. In a circuit for obtaining the absolute difference of two signals using different paths for positive and negative signal voltages;

(a) an input terminal and an output terminal, said input terminal having two signals applied thereto for obtaining the absolute difference thereof, (b) an input resistance connected between said input terminal and ground, and an output resistance connected between said output terminal and ground, (c) a pair of diodes, one having its anode and the other having its cathode connected to said input terminal, (d) a first capacitor means, and a transistor amplifier means having a collector, emitter and base, said transistor amplifier means having its collector connected to said output terminal through said first capacitor means, (e) the cathode of said one diode connected to the base of said transistor amplifier means, (f) a second capacitor means, the anode of said other diode connected to said output terminal through said second capacitor means, (g) the polarity of the resultant value of two signals applied at said input terminal being dependent upon the polarity and amplitude of the applied signals, (h) where the resultant of said input signals is negative said one diode connected to said output terminal conducts, said other diode is reverse biased, and the voltage across said output resistance is negative, (i) where the resultant of said input signals is positive said one diode is reverse biased and said other diode conducts applying a positive input voltage to the base of said transistor amplifier means thus the output signal at the collector of said transistor amplifier means is negative and therefore the output signal across said output resistance again is negative.

2. In a circuit for obtaining the absolute difference of two signals using different paths for positive and negative signal voltages;

(a) an input terminal and an output terminal, said input terminal having two signals applied thereto for obtaining the absolute difference thereof, (b) an input resistance connected between said input terminal and ground, and an output resistance connected between said output terminal and ground, (c) a pair of diodes, one having its anode and the other having its cathode connected to said input terminal, (d) a first capacitor means, and a transistor amplifier means having a collector, emitter and base, said transistor amplifier means having its collector connected to said output terminal through said first capacitor means, (e) the cathode of said one diode connected to the base of said transistor amplifier means, (f) a second capacitor means, the anode of said other diode connected to said output terminal through said second capacitor means, (g) means for supplying respective bias voltages to each of said pair of diodes, and means for adjusting the bias voltage to each of said pair of diodes, (h) the polarity of the resultant value of two signals applied at said input terminal being dependent upon the polarity and amplitude of the applied signals, (i) where the resultant of said input signals is negative said one diode connected to said output terminal conducts, said other diode is reverse biased, and the voltage across said output resistance is negative, (j) where the resultant of said input signals is positive said one diode is reverse biased and said other diode conducts applying a positive input voltage to the base of said transistor amplifier means thus the output signal at the collector of said transistor amplifier means is negative and therefore the output signal across said output resistance again is negative.

3. In a circuit for obtaining the absolute difference of two signals using different paths for positive and negative signal voltages;

(a) an input terminal and an output terminal, said input terminal having two signals applied thereto for obtaining the absolute difference thereof, (b) an input resistance connected between said input terminal and ground, and an output resistance connected between said output terminal and ground, (c) a pair of diodes, one having its anode and the other having its cathode connected to said input terminal, (d) first capacitor means, and a transistor amplifier means having a collector, emitter and base, said transistor amplifier means having its collector connected to said output terminal through said first capacitor means, (e) the cathode of said one diode connected to the base of said transistor amplifier means, (f) a second capacitor means, the anode of said other diode connected to said output terminal through said second capacitor means, (g) means for supplying respective bias voltages to each of said pair of diodes, and means for adjusting the bias of each of said pair of diodes, (h) gain adjusting means and frequency adjusting means for adjusting the gain and frequency of said transistor amplifier means, (i) the polarity of the resultant value of two signals applied at said input terminal being dependent upon the polarity and amplitude of the applied signals, (j) where the resultant of said input signals is negative said one diode connected to said output terminal conducts, said other diode is reverse biased, and the voltage across said output resistance is negative, (k) where the resultant of said input signals is positive said one diode is reverse biased and said other diode conducts applying a positive input voltage to the base of said transistor amplifier means thus the output signal at the collector of said transistor amplifier means is negative and therefore the output signal across said output resistance again is negative.

4. In a circuit for obtaining the absolute difference of two signals using different paths for positive and negative signal voltages;

(a) an input terminal and an output terminal, said input terminal having two signals applied thereto for obtaining the absolute difference thereof, (b) an input resistance connected between said input terminal and ground, and an output resistance connected between said output terminal and ground, (c) a pair of diodes, one having its anode and the other having its cathode connected to said input terminal, (d) a Zener diode having its anode connected to said output terminal, (e) a transistor amplifier means having its collector connected to the cathode of said Zener diode and thus through said Zener diode to said output terminal, (f) the cathode of said one diode connected to the base of said transistor amplifier means, (g) the anode of said other diode connected to said output terminal, (h) the polarity of the resultant value of two signals applied at said input terminal being dependent upon the polarity and amplitude of the applied signals, (i) where the resultant of said input signals is negative said one diode connected to said output terminal conducts, said other diode is reverse biased, and the voltage across said output resistance is negative, (j) where the resultant of said input signals is positive said one diode is reverse biased and said other diode conducts applying a positive input voltage to the base of said transistor amplifier means thus the output signal at the collector of said transistor amplifier means is negative and therefore the output signal across said output resistance again is negative.

5. In a circuit for obtaining the absolute difference of two signals using different paths for positive and negative signal voltages;

(a) an input terminal and an output terminal, said input terminal having two signals applied thereto for obtaining the absolute difference thereof, (b) an input resistance connected between said input terminal and ground, and an output resistance connected between said output terminal and ground, (c) a pair of diodes, one having its anode and the other having its cathode connected to said input terminal, (d) a Zener diode having its anode connected to said output terminal, (e) a transistor amplifier means having a collector, emitter and base, said transistor amplifier means having its collector connected to the cathode of said Zener diode and thus through said Zener diode to said output terminal, (f) the cathode of said one diode connected to the base of said transistor amplifier means, (g) the anode of said other diode connected to said output terminal, (h) means for supplying respective bias voltages to each of said pair of diodes, and means for adjusting the bias voltage to each of said pair of diodes, (i) the polarity of the resultant value of two signals applied at said input terminal being dependent upon the polarity and amplitude of the applied signals, (j) where the resultant of said input signals is negative said one diode connected to said output terminal conducts, said other diode is reverse biased, and the voltage across said output resistance is negative, (k) where the resultant of said input signals is positive said one diode is reverse biased and said other diode conducts applying a positive input voltage to the base of said transistor amplifier means thus the output signal at the collector of said transistor amplifier means is negative and therefore the output signal across said output resistance again is negative.

6. In a circuit for obtaining the absolute difference of two signals using different paths for positive and negative signal voltages;

(a) an input terminal and an output terminal, said input terminal having two signals applied thereto for obtaining the absolute difference thereof, (b) an input resistance connected between said input terminal and ground, and an output resistance connected between said output terminal and ground, (c) a pair of diodes, one having its anode and the other having its cathode connected to said input terminal, (d) a Zener diode having its anode connected to said output terminal, (e) a transistor amplifier means having a collector, emitter and base, said transistor amplifier means having its collector connected to the cathode of said Zener diode and thus through said Zener diode to said output terminal, (f) the cathode of said one diode connected to the base of said transistor amplifier means, (g) the anode of said other diode connected to said output terminal, (h) means for supplying respective bias voltages to each of said pair of diodes, and means for adjusting the bias voltage to each of said pair of diodes, (i) gain adjusting means and frequency adjusting means for adjusting the gain and frequency of said transistor amplifier means, (j) the polarity of the resultant value of two signals applied at said input terminal being dependent upon the polarity and amplitude of the applied signals, (k) where the resultant of said input signals is negative said one diode connected to said output terminal conducts, said other diode is reverse biased, and the voltage across said output resistance is negative, (l) where the resultant of said input signals is positive said one diode is reverse biased and said other diode conducts applying a positive input voltage to the base of said transistor amplifier means thus the output signal at the collector of said transistor amplifier means is negative and therefore the output signal across said output resistance again is negative.

7. In a circuit for obtaining the absolute difference of two signals using different paths for positive and negative signal voltages;

(a) an input terminal and an output terminal, said input terminal having two signals applied thereto for obtaining the absolute difference thereof, (b) an input resistance connected between said input terminal and ground, and an output resistance connected between said output terminal and ground, (c) a pair of diodes, one having its anode and the other having its cathode connected to said input terminal, (d) a coupling means (e) a transistor amplifier means having a collector, emitter and base, said transistor amplifier means having its collector connected to said output terminal through said coupling means, (f) the cathode of said one diode connected to the base of said transistor amplifier means, (g) the anode of said other diode connected to said output terminal, (h) the polarity of the resultant value of two signals applied at said input terminal being dependent upon the polarity and amplitude of the applied signals, (i) where the resultant of said input signals is negative said one diode connected to said output terminal conducts, said other diode is reverse biased, and the voltage across said output resistance is negative, (j) where the resultant of said input signals is positive said one diode is reverse biased and said other diode conducts applying a positive input voltage to the base of said transistor amplifier means thus the output signal at the collector of said transistor amplifier means is negative and therefore through said coupling means the output signal across said output resistance again is negative.

8. In a circuit for obtaining the absolute difference of two signals using different paths for positive and negative signal voltages;

(a) an input terminal and an output terminal, said input terminal having two signals applied thereto for obtaining the absolute difference thereof, (b) an input resistance connected between said input terminal and ground, and an output resistance connected between said output terminal and ground, (c) a pair of diodes, one having its anode and the other having its cathode connected to said input terminal, (d) a first coupling means, (e) a transistor amplifier means having a collector, emitter and base, said transistor amplifier means having its collector connected to said output terminal through said first coupling means, (f) the cathode of said one diode connected to the base of said transistor amplifier means, (g) a second coupling means, (h) the anode of said other diode connected to said output terminal through said second coupling means, (i) means for supplying respective bias voltages to each of said pair of diodes, and means for adjusting the bias voltage to each of said pair of diodes, (j) the polarity of the resultant value of two signals applied at said input terminal being dependent upon the polarity and amplitude of the applied signals, (k) where the resultant of said input signals is negative said one diode connected to said output terminal conducts, said other diode is reverse biased, and the voltage across said output resistance is negative, (l) where the resultant of said input signals is positive said one diode is reverse biased and said other diode conducts applying a positive input voltage to the base of said transistor amplifier means thus the output signal at the collector of said transistor amplifier means is negative and therefore the output signal across said output resistance again is negative.

9. In a circuit for obtaining the absolute difference of two signals using different paths for positive and negative signal voltages;

(a) an input terminal and an output terminal, said input terminal having two signals applied thereto for obtaining the absolute difference thereof, (b) an input resistance connected between said input terminal and ground, and an output resistance connected between said output terminal and ground,
(c) a pair of diodes, one having its anode and the other having its cathode connected to said input terminal,
(d) a coupling means,
(e) a transistor amplifier means having a collector, emitter and base, said transistor amplifier means having its collector connected to said output terminal through said coupling means,
(f) the cathode of said one diode connected to the base of said transistor amplifier means,
(g) the anode of said other diode connected to said output terminal,
(h) means for supplying respective bias voltages to each of said pair of diodes, and means for adjusting the bias voltage to each of said pair of diodes,
(i) gain adjusting means and frequency adjusting means for adjusting the gain and frequency of said transistor amplifier means,
(j) the polarity of the resultant value of two signals applied at said input terminal being dependent upon the polarity and amplitude of the applied signals,
(k) where the resultant of said input signals is negative said one diode connected to said output terminal conducts, said other diode is reverse biased, and the voltage across said output resistance is negative,
(l) where the resultant of said input signals is positive said one diode is reverse biased and said other diode conducts applying a positive input voltage to the base of said transistor amplifier means thus the output signal at the collector of said transistor amplifier means is negative and therefore through said coupling means the output signal across said output resistance again is negative.

No references cited.

ARTHUR GAUSS, *Primary Examiner.*

J. ZAZWORSKY, *Assistant Examiner.*